Nov. 28, 1961  V. E. BROCK  3,010,339
CAM MECHANICAL MOVEMENT
Filed March 17, 1958  4 Sheets-Sheet 1

VESTLE E. BROCK
INVENTOR.

BY George Douglas Jones
ATTORNEY

VESTLE E. BROCK
INVENTOR.

Nov. 28, 1961  V. E. BROCK  3,010,339
CAM MECHANICAL MOVEMENT
Filed March 17, 1958  4 Sheets-Sheet 3

VESTLE E. BROCK
INVENTOR.

BY George Douglas Jones
ATTORNEY

Nov. 28, 1961 V. E. BROCK 3,010,339
CAM MECHANICAL MOVEMENT
Filed March 17, 1958 4 Sheets-Sheet 4

VESTLE E. BROCK
INVENTOR.

BY George Douglas Jones
ATTORNEY

United States Patent Office 3,010,339
Patented Nov. 28, 1961

3,010,339
CAM MECHANICAL MOVEMENT
Vestle E. Brock, West Covina, Calif., assignor to Richard M. Densmore, South Gate, Los Angeles, Calif.
Filed Mar. 17, 1958, Ser. No. 721,922
4 Claims. (Cl. 74—568)

This invention relates to a new and useful improved mechanical movement and is more particularly directed to a cam having a dual characteristic, wherein the characteristic is controlled by the direction of rotation of the said cam.

The principal object of the invention is to provide a mechanical movement, involving a cam, in which the said cam action upon rotation thereof performs a dual function.

A further object of the invention is to provide a mechanism to drive a pump, the magnitude of the volume delivered by the pump is governed by the rotation of the mechanism, either in a clock-wise or counter clock-wise rotation.

A still further object of the invention, is to provide a dual mechanism, wherein the characteristic of the moment of force is controlled by the direction of rotation of the mechanism.

Another object of the invention is to provide a mechanical movement involving a cam, in which the said cam upon rotation thereof provides a gain in force and a loss in motion and upon reversing the rotation, provides a loss in force and a gain in motion.

Other related objects and advantages will appear hereinafter.

Figure 1:
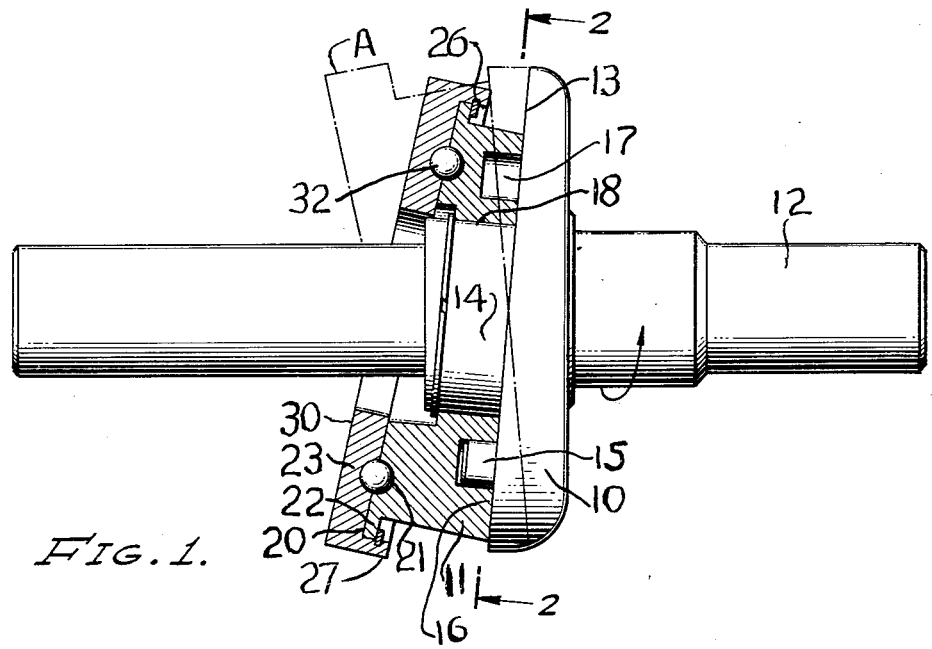
FIG. 1 is a sectional view of the wobble plate mechanism illustrating the maximum horizontal axial movement thereof.
Figure 3:
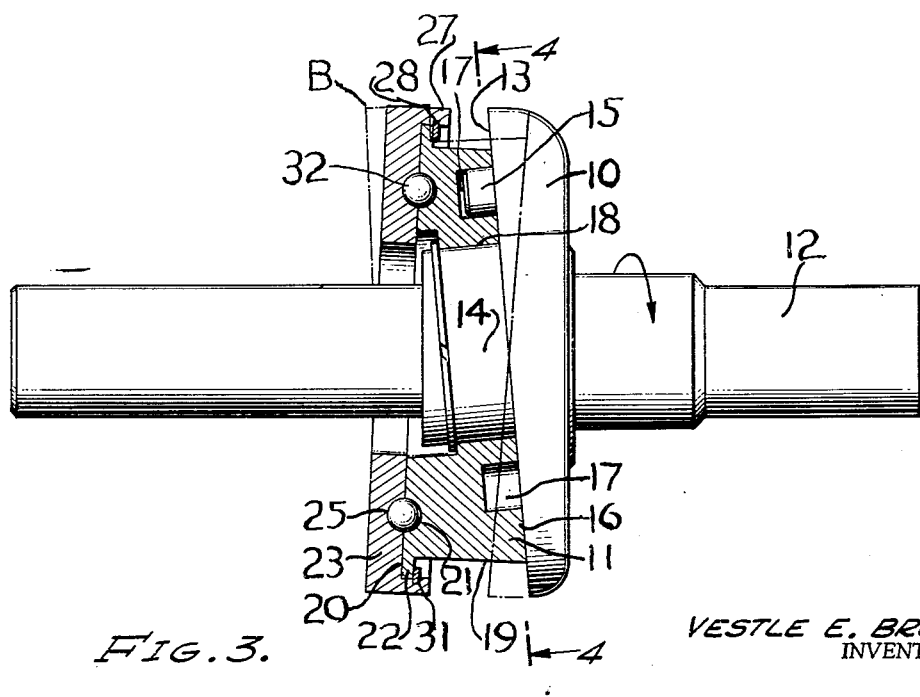
FIG. 3 is a sectional view of the wobble plate mechanism illustrating the minimum horizontal axial movement thereof.

Referring now to the drawings by numerals of reference wherein like numerals refer to like parts; the structure as illustrated in FIG. 1 and FIG. 3 of the drawings, illustrates the preferred embodiment of my invention, reduced to its simplest form and is directed to a reciprocating movement in a horizontal plane parallel to the axis of the driving member.

In the said form, plates 10 and 11, FIG. 1 and FIG. 3, comprise two essential members of the invention, as directed to the said reciprocating movement. It is to be understood that the principle as set forth above and to follow is also applicable to the mechanism producing a reciprocating movement in a plane perpendicular to the axis of the driving member, the description of which will follow.

The drive plate or cam 10, FIG. 1, is carried on and preferably forms an integral part of shaft 12, being positioned thereon and having an inner face 13, which is in angular relation to the axis of the shaft 12.

A bearing portion 14, is preferably of cylindrical form, the periphery of which is perpendicular to the face 13 of the drive plate or cam 10.

Positioned on the face 13 and intermediate the axis and the periphery thereof, is an abutment or stop member 15.

The function of the bearing portion 14 is to provide a base portion for the plate 11 to be carried thereon and to permit rotation of the said plate 11. It is to be understood that other means of support for the said plate may be provided without departing from the scope of the invention.

Figure 4:
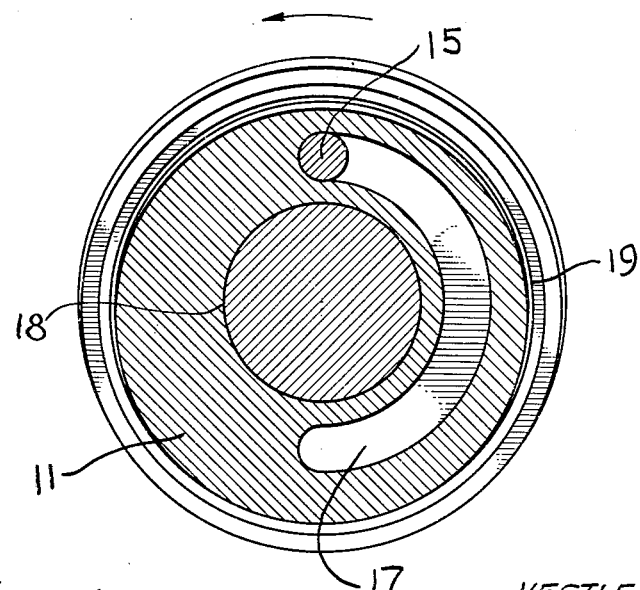
FIG. 4 is a sectional view taken on line 4—4 of FIG. 3, illustrating the minimum movement position of the mechanism.

Plate 11, which may be defined as the driven plate or driven member is provided with a face 16, the said face being in intimate contact with the face 13 of the drive plate or cam 10. The said face is provided with a groove 17, best illustrated in FIGS. 2 and 4 of the drawings. The said groove is positioned intermediate the periphery 18 of the bore of the said plate or cam and the external periphery 19 thereof. The said groove is so positioned as to permit and limit rotation of the said plate or cam to 180 degrees, the purpose of which will be treated as the description continues.

The outer face 20 of the plate 11 is preferably provided with a ball race 21, the periphery of the said face having a lip 22 thereon.

A working face member 23 may be of any desired design required to fit the functioning requirements of the device to be operated, providing that the face 30 of the working face is parallel to face 20 of member 11. The working face member is provided with a ball race intermediate its axis and periphery and registers with the ball race 21 of plate 11. The inner periphery of the said face member designated as 26 is extended at 27, and the inner portion of which is grooved at 28, the said groove forming a circular retaining means for the retainer ring 31.

Balls 32 are positioned in the race ways 21 and 25, thus providing a ball bearing means for the working face 23.

It should be here noted, that, the face 16 of plate 11 and face 20 of plate 11 are not parallel and face 13 of plate or cam 10 is not perpendicular to the axis of shaft 12. This arrangement provides the principle to produce the dual characteristics of the invention.

It is therefore important that the center line of the bearing portion 14 and the center line of shaft 12 meet at the plane formed by face 30 of the working face 23. This procedure should be followed for all practical purposes and for efficient design and which allow plate 11 to preferably rotate 180 degrees with respect to plate or cam 10.

It has been found that the rotation of 180 degrees provides the most efficient functioning position for the working face member 23, however, as the degree of the arc is reduced the movement of the working face member is also reduced.

Figure 2:
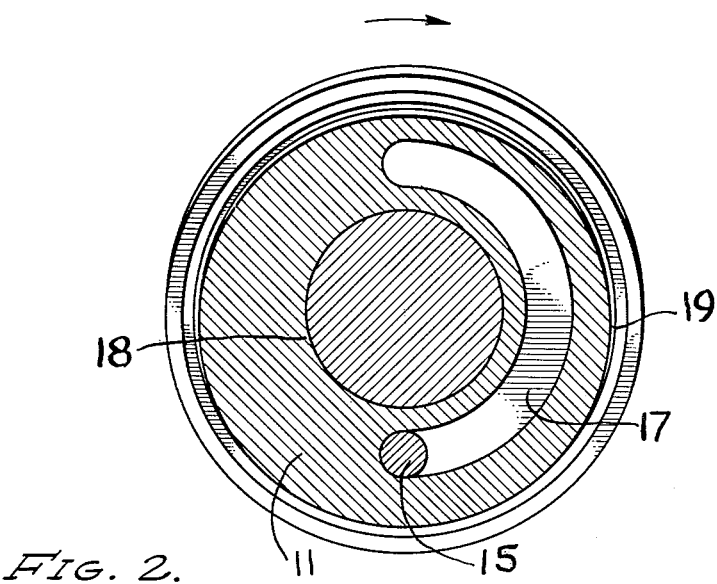
FIG. 2 is a sectional view taken on line 2—2 of FIG. 1, illustrating the maximum movement position of the mechanism.

The functioning of the above device is best described as a wobble plate reciprocating in axial relation to the drive shaft 12. The maximum movement of the wobble plate is best illustrated in FIG. 1 of the drawings, in which the abutment or stop member 15 is in intimate or abutting relation with the lower end of the groove 17; when the direction of rotation is clock-wise, as indicated by the dash-line A FIG. 1, the movement of the working face member 23 is at its maximum. The position of groove in relation to the abutment member 15 is best illustrated in FIG. 2 of the drawings.

Upon reversal of the shaft 12 to counter clock-wise rotation the movement of the working face member 23 is reduced to its minimum movement, as indicated by dash-line B in FIG. 3 of the drawings.

Figure 5:
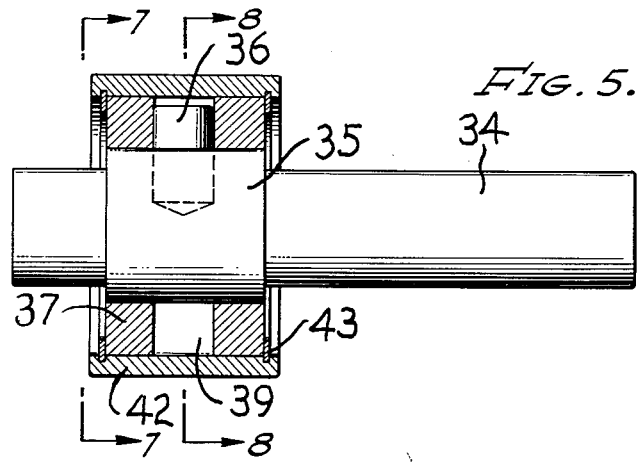
FIG. 5 is a sectional view of the mechanism so arranged to produce a perpendicular movement to the axis of rotation of the device.
Figure 6:
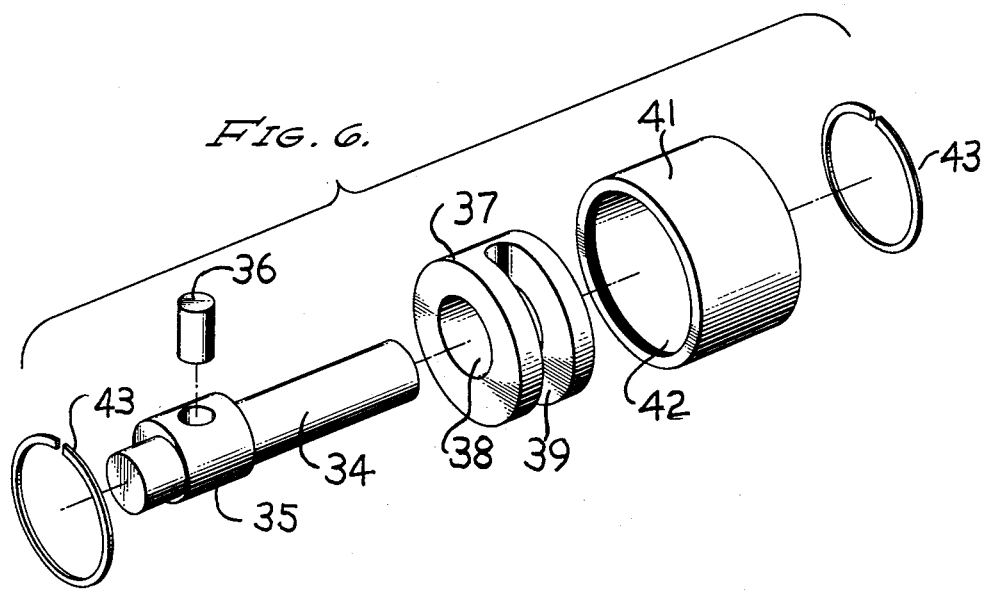
FIG. 6 is an isometric view illustrating the component parts of the mechanism illustrated in FIG. 5.
Figure 7:
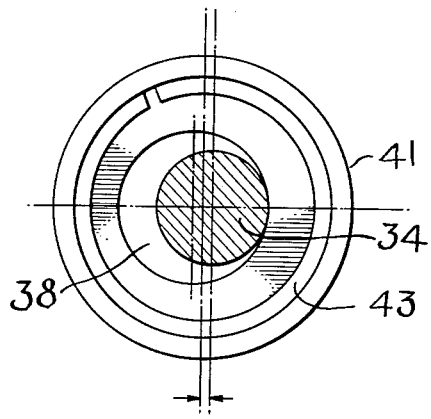
FIG. 7 is a sectional view taken on line 7—7 of FIG. 5, illustrating the position of the mechanism for minimum movement.

When it is desired to provide the mechanism of this invention to produce a movement in the plane perpendicular to the axis of rotation and without departing from the scope of the invention, the mechanism illustrated in FIGS. 5 and 6 and herewith described is used.

Drive shaft 34 is provided with a cam portion 35 and having positioned therein an abutment or stop member 36. A member 37 having an eccentric bore 38 and an open groove 39, the said groove being preferably centered between the faces thereof and extending 180 degrees of the circumference of the member 37.

The container member 42 houses members and maintaining the several parts in their relative positions preferably by means of lock rings 43 or similar device.

Figure 10:
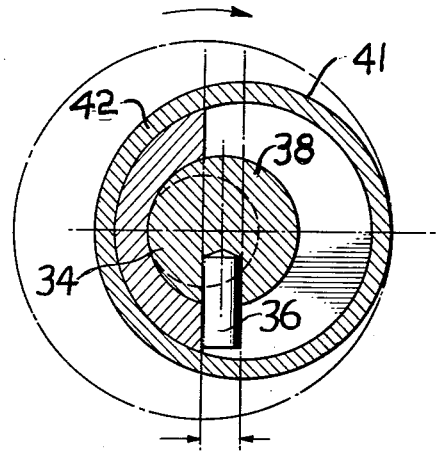
FIG. 10 is a sectional view illustrating the position of the abutment for maximum movement; the arrow indicates the direction of travel of rotation.

The shaft 34 when revolving in clock-wise rotation, as best illustrated in FIG. 10 of the drawings, produces the maximum perpendicular to the axis of movement of the working face 41 of the container member 42. Reversal of rotation of the drive, or counter clock-wise rotation results or produces the minimum movement of the working face 41.

Figure 8:
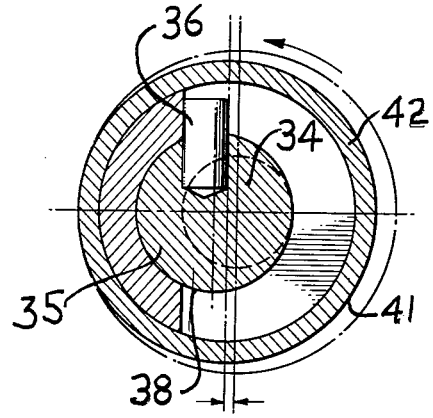
FIG. 8 is a sectional view taken on line 8—8 of FIG. 5, illustrating the position of the abutment for minimum movement; the arrow indicates the direction of rotation.
Figure 9:
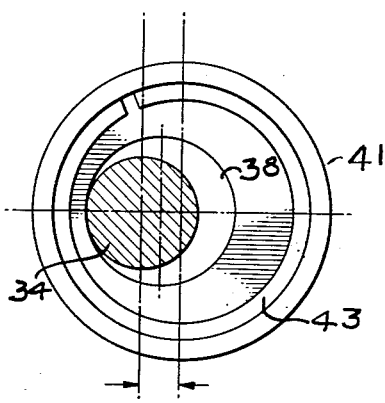
FIG. 9 is a sectional view illustrating the position of the mechanism for maximum movement.

The position of the cam in relation to the abutment or stop member 36 in its minimum movement position is best illustrated in FIG. 8, the direction of rotation indicated by the arrow.

The position of the cam in relation to the abutment or stop member 36 in its maximum movement position is best illustrated in FIG. 10 of the drawing and the direction of rotation is indicated by the arrow.

No attempt has been made in this application to illustrate or describe the various and sundry uses to which this mechanical movement may be applied.

The description has been directed solely to the structure which is the invention whereby the two reciprocating movements produced by the rotation of the device in one or the other direction respectively each result in a moment of force of differing characteristics.

It is believed obvious that one skilled in the art can apply the mechanical movement to the myriad applications to which this new and improved mechanical movement may be used, and more especially where reciprocating movement is required, although rocking, shaking, vibrating and similar movements may be required.

Having fully described my invention, it is to be understood that I do not wish to be limited to the details herein set forth, but my invention is of the full scope of the appended claims.

I claim:

1. A mechanical mechanism comprising a drive shaft driven by external means, an integral driving plate carried by said shaft, the inner face of said plate being inclined with respect to the axis of said shaft, a pin mounted on the inner face of said plate, a driven plate mounted on a shaft bearing member the outer surface of which is correspondingly inclined with respect to the axis of rotation of said shaft, the outer face of said driven plate being inclined with respect to the inner face of said driving member, the inner face of said driven plate being provided with a groove extending 180 degrees circumferentially plus or minus 10 degrees, the said groove receiving the said pin, the center line of the bearing portion of the bearing member and the center line of the shaft meeting at the plane formed by the outer face of the driven plate, upon clockwise rotation of said driven plate the pin moves to engage one end of the said groove driving said driven plate outer face at maximum angle relative to the center line of said shaft and solely by reversing direction of rotation of said driven plate the pin moves into contact with the opposite end of said groove producing minimum angle of said outer face relative to the center line of said shaft, thereby changing linear travel of said driven plate outer face solely by direction of rotation of said driving plate.

2. A mechanical mechanism, comprising, a drive shaft driven by external means, a driving plate carried by said shaft for rotation therewith, the inner face of said plate being inclined with respect to the axis of said shaft, a stop member carried on the inner face of said plate, a driven plate, means for mounting said driven plate on said shaft for rotation on an axis substantially perpendicular to said inner face, the outer face of said driven plate being inclined with respect to the inner face of said driving plate, the inner face of said driven plate being in bearing relationship with the inner face of said driving plate and provided with an arcuate groove, the said groove receiving the said stop member, whereupon, upon clockwise rotation of said driven plate the stop member moves to engage one end of said groove driving said driven plate outer face at maximum angle relative to the center line of said shaft and solely by reversing direction of rotation of said driven plate moves the stop member in contact with the opposite end of said groove, producing minimum angle of said outer face relative to the center line of said shaft, thereby changing linear travel of said driven plate outer face solely and without other means and only by direction of rotation of said driving plate.

3. A mechanical mechanism, comprising, a drive shaft driven by external means, a driving plate carried by said shaft for rotation therewith, the inner face of the said plate being inclined with respect to the axis of said shaft, a stop member carried on the inner face of said plate, a driven plate, means for mounting said driven plate on said shaft for rotation on an axis substantially perpendicular to said inner face, the outer face of said driven plate being inclined with respect to the inner face of said driving plate and being in bearing relationship with the inner face of said driving plate and provided with an arcuate groove extending 180 degrees circumferentially, plus or minus 10 degrees, the said groove receiving the said stop member, whereupon, upon clockwise rotation of said driven plate the stop member moves to engage one end of said groove, driving the said driven plate outer face at a maximum angle relative to the center line of said shaft and solely without other means than by reversing direction of rotation of said driven plate, moves the stop member in contact with the opposite end of said groove, producing minimum angle of the said outer face relative to the center line of said shaft, thereby changing linear travel of said driven plate outer face by direction of rotation of said driving plate.

4. A mechanical mechanism, including, a drive shaft driven by external means, a driving plate carried by said shaft for rotation therewith, the inner face of said plate being inclined with respect to the axis of said shaft, a stop member carried on the inner face of said plate, a driven plate, means for mounting said driven plate on said shaft for rotation on an axis substantially perpendicular to said inner face, the outer face of said driven plate being inclined with respect to the inner face of said driving plate, the inner face of said driven plate being in bearing relationship with the inner face of said driving plate and provided with an arcuate groove extending 180 degrees circumferentially plus or minus 10 degrees, a wearing member journaled on the outer face of said driven plate, means to secure said wearing member for rotation therewith and bearing means intermediate the said wearing member inner face and the driven plate outer face, whereupon, upon clockwise rotation of said driven plate the stop member moves to engage one end of said groove driving said driven plate outer face at maximum angle relative to the center line of said shaft, thereby changing linear travel of said driven plate outer face, solely by direction of rotation of said driving plate.

References Cited in the file of this patent

UNITED STATES PATENTS

| | | |
|---|---|---|
| 287,023 | Hatch et al. | Oct. 23, 1883 |
| 511,044 | Cooper et al | Dec. 19, 1893 |
| 859,866 | Atkins | July 9, 1907 |
| 883,179 | Ditwiler | Mar. 31, 1908 |
| 1,250,761 | Baeck | Dec. 18, 1917 |
| 1,565,264 | Dubi | Dec. 15, 1925 |
| 1,875,854 | Cooper | Sept. 6, 1932 |
| 2,561,344 | Cutler et al. | July 24, 1951 |
| 2,610,810 | Pelouch | Sept. 16, 1952 |
| 2,753,721 | Latta | July 10, 1956 |
| 2,933,049 | Johnston | Apr. 19, 1960 |